INVENTORS
WILLIAM S. WEST
PARKER C. HENCHMAN
BY Raphael Semmes
ATTORNEY

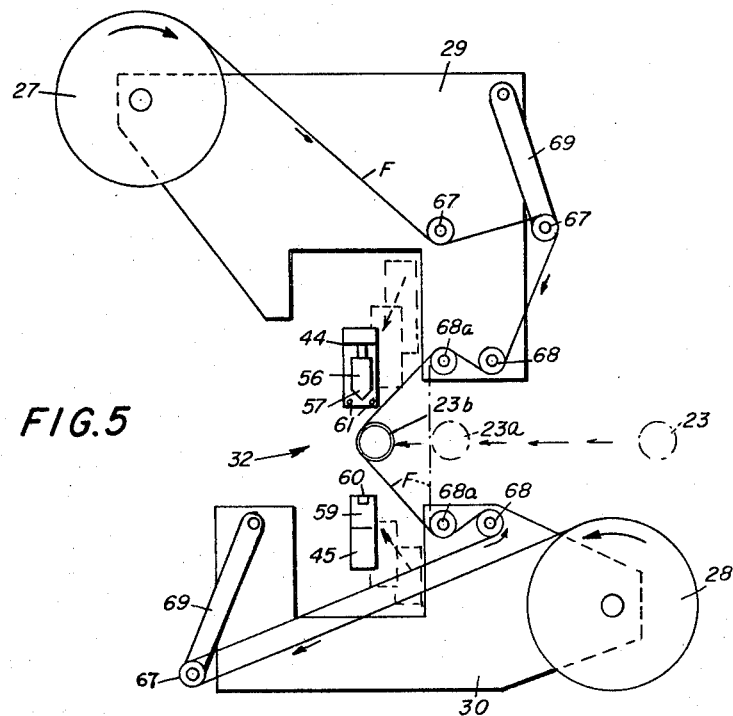
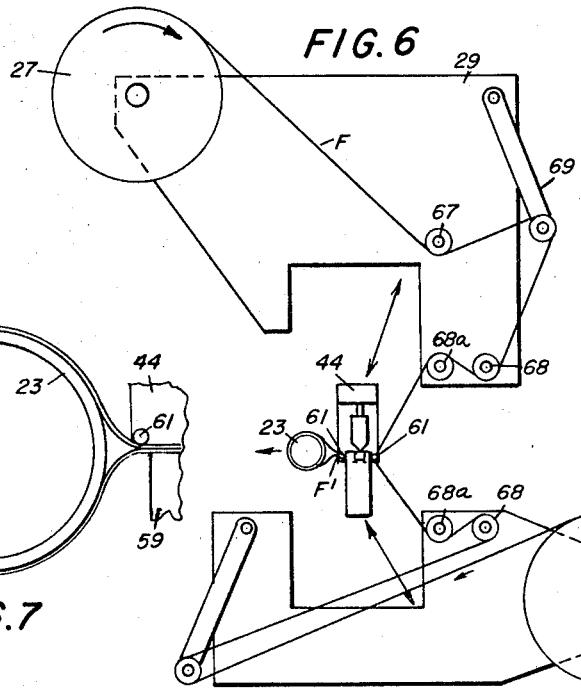
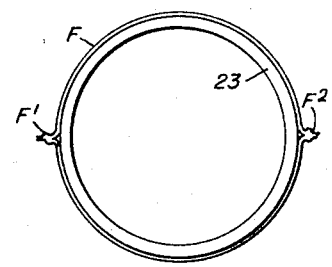
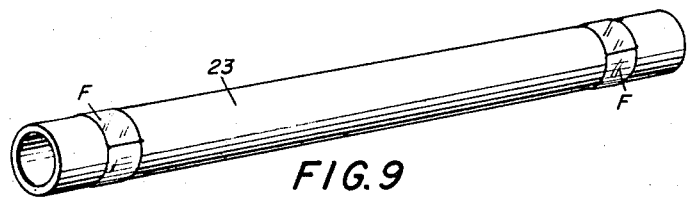

3,523,402
APPARATUS FOR BANDING TUBES
William S. West, San Marino, and Parker C. Henchman, Marina Del Rey, Calif., assignors to Cleo Wrap Corporation, Memphis, Tenn., a corporation of Tennessee
Filed Feb. 20, 1968, Ser. No. 706,988
Int. Cl. B65b 25/14, 13/32
U.S. Cl. 53—198    2 Claims

ABSTRACT OF THE DISCLOSURE

A machine for applying plastic bands to opposite ends of tubes having sheets of paper or the like rolled thereon. The machine has a continuously, horizontally moving, endless conveyor carrying a series of spaced pairs of transverse rollers, respective pairs being arranged to sequentially receive the tubes to be banded. The rollers engage tracks which impart counterclockwise rotation thereto, and, in turn, clockwise rotation to the supported tubes to maintain the rolls of paper in wound condition on the tubes. As the top run of the conveyor continuously advances, opposite ends of the supported tubes successively engage strips of heat-shrinkable plastic film which intercept the path of travel of the conveyor. Opposite ends of the strips are fed from and supported by separate supply reels, and the continued advance of the tubes causes the plastic strips to peripherally embrace the ends of the tubes. Thereafter, alternately opening and closing fusing and severing units engage the strips behind the tubes, fusing the same to form bands around the tubes and simultaneously fusing the severed ends of the adjacent portions of the strips to unite them for the next banding sequence. Following the actual banding operation, where the bands loosely embrace the ends of the tubes, the tubes are advanced to a heating unit to tightly shrink the bands on the tubes.

BACKGROUND OF INVENTION

The invention relates to the field of banding the ends of tubes or cores having sheets of paper and related products wound thereon so as to prevent the unwinding of the paper during subsequent handling and processing, the bands being applied in such a manner as to facilitate easy removal by the consumer without damaging the product. A typical example of the use of the invention would be in connection with gift wrapping papers which are wound on cardboard tubes or cores.

In the past, pressure-sensitive tape has been used for this purpose, as well as adhesive droplets applied to the product to prevent unwinding. However, with pressure-sensitive tape, when the tape is removed from the product by the consumer, some portion of the product is destroyed or disfigured, regardless of the care exercised. When adhesive droplets are applied to the product, the manufacturing process is quite difficult to control and suffers from the same problems from the consumer's standpoint as the pressure-sensitive tape, above referred to.

SUMMARY OF INVENTION

The present invention effectively meets the problems encountered with previous methods by providing a continuous system for sequentially advancing a series of rolls of paper or the like, wound on tubes or cores, through a banding station where strips of a heat shrinkable plastic film, extending between spaced pairs of supply reels, are disposed to intercept the ends of the tubes as they advance. The strips are partially wrapped around the ends of the advancing tubes, and, thereafter, while continuing to advance, the strips are simultaneously fused and severed, providing bands which loosely embrace the ends of the tubes. The continued advance of the tubes exposes the bands to a heat source which shrinks the bands around the tubes in tight engagement, following which the banded tubes are discharged from the machine.

The invention provides a continuous, fully automatic, smoothly flowing operation, with no destruction of the product, either during manufacture or by the consumer when removing the securing bands.

THE DRAWINGS

Referring to the drawings in which numerals of like character designate similar parts throughout the several views:

FIG. 5 is a diagrammatic illustration of the system with the fusing and severing elements retracted;

FIG. 6 is a similar view with the fusing and severing elements in operative position;

FIG. 7 is an enlarged detail showing an end of the tube with the band in the course of application;

FIG. 8 is a similar view showing the band after being shrunk on the tube; and

FIG. 9 is a perspective view of a banded tube.

DETAILED DESCRIPTION OF INVENTION

Figure 1:
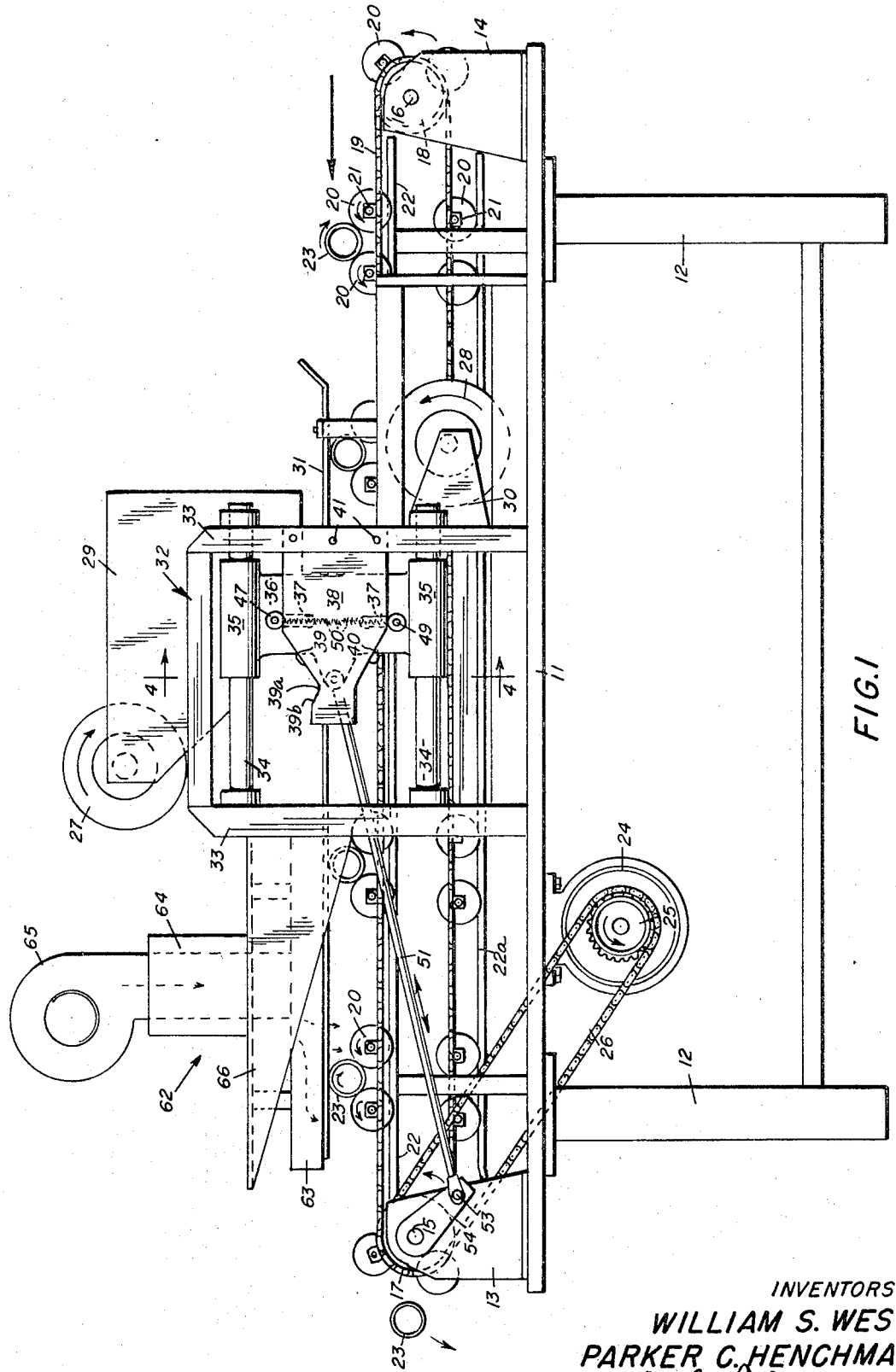
FIG. 1 is a view of the banding machine in side elevation.

In the drawings, the numeral 11 represents an elongated frame or table top, supported by legs 12, and provided at each end with pairs of laterally spaced, upstanding brackets 13 and 14, respective pairs being adapted to rotatably support conveyor shafts 15 and 16. A pair of driven sprockets 17 are spaced longitudinally on and keyed or otherwise secured to the conveyor shaft 15, and a similarly spaced pair of idler sprockets 18 are rotatably mounted on the opposite conveyor shaft 16. Endless conveyor chains 19 operatively engage the sprockets 17 and 18 on opposite sides of the machine.

At longitudinally spaced intervals, the conveyor chains 18 carry pairs of transverse, parallel rollers 20, arranged in spaced relation with their opposite ends rotatably supported on respective conveyor chains by any suitable means, such as journals 21, and beneath the top run of roller pairs, longitudinally extending tracks 22 are disposed for rolling, frictional engagement with the rollers as they advance. Thus, when each pair of rollers engage the tracks 22, they are caused to rotate in counterclockwise direction so that when a tube 23, with a sheet of paper or the like wound thereon, is nested between the respective rollers 20 of each pair, the tube is caused to rotate in clockwise direction to thereby maintain the paper in wound condition as it advances to the banding station, to be described.

Figure 3:
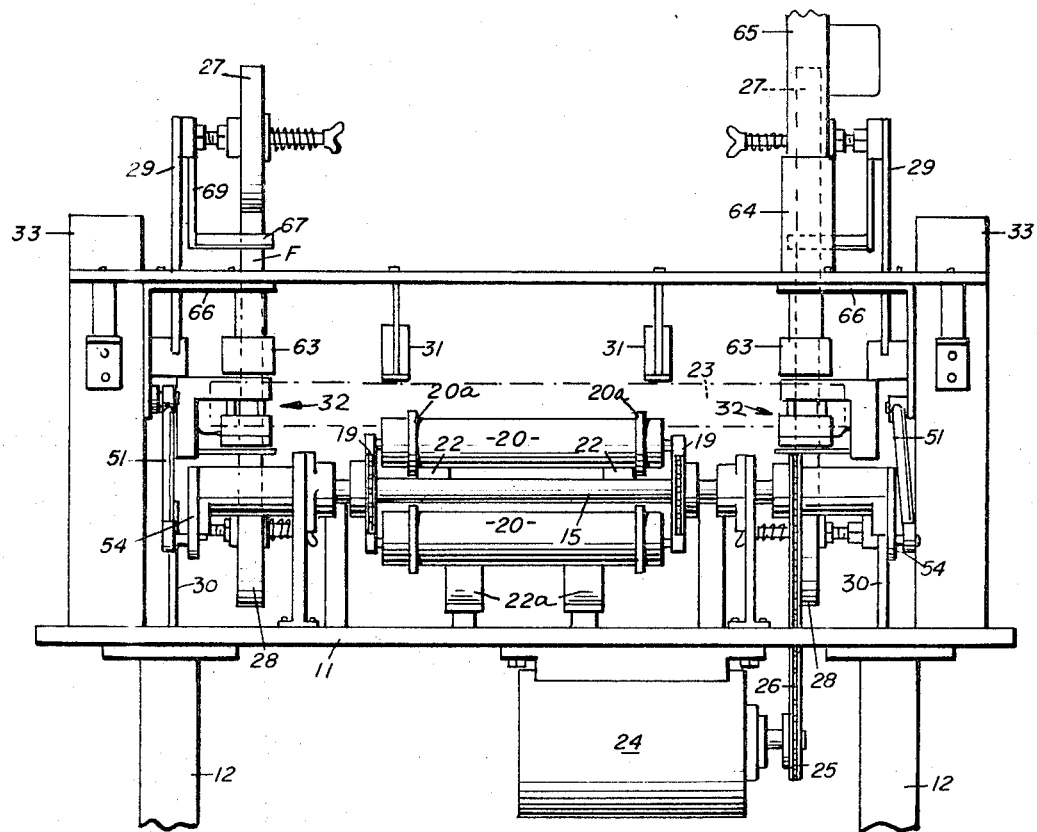
FIG. 3 is an end view of the machine.

As seen in FIG. 3, the rollers 20 may be provided with peripheral ribs 20a to insure the proper alignment of the rollers with the upper track 22, much the same as railway wheel flanges.

A motor 24 is suitably mounted, preferably on the underside of the table top 11, and through sprocket 25 and drive chain 26 is operatively connected to one driven sprocket 17, fixed to shaft 15. Thus, when the motor is energized, the endless conveyor chains 19 are caused to continuously travel around their sprockets, advancing the spaced pairs of tube-supporting rollers 20.

Figure 2:
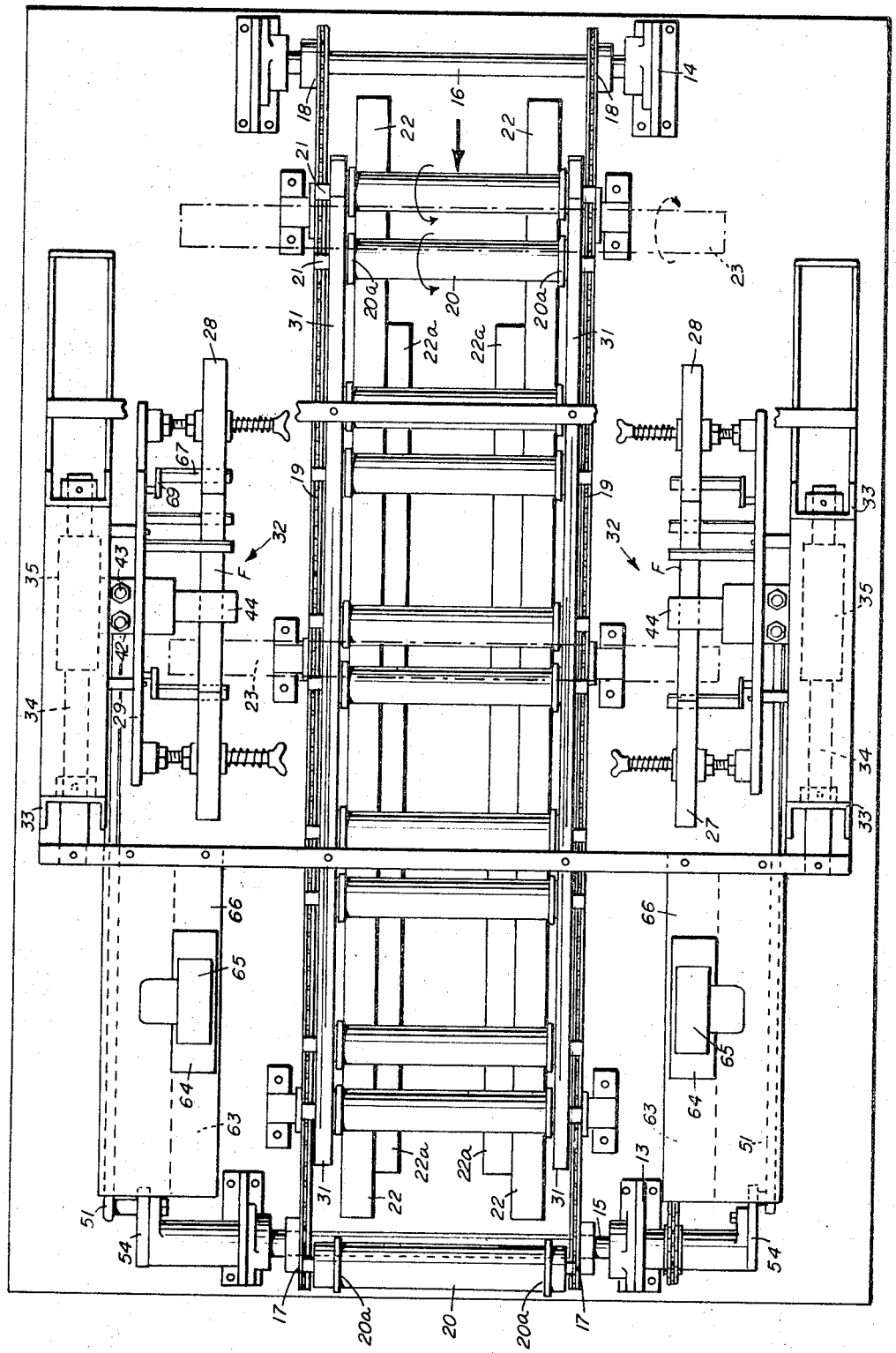
FIG. 2 is a top plan view.

If desired, return runners or tracks 22a may be provided as shown in FIGS. 1 and 2 to support the pairs of rollers on the lower run of the conveyor as they are returned to the inlet end of the machine.

THE BANDING UNIT

As best seen in FIGS. 1 and 3, at opposite sides of the conveyor assembly 19–20, the table top 11, through any suitable frame structure, supports upper and lower films reels 27 and 28. The upper reels 27 are supported by brackets 29 and the lower reels 28 by brackets 30. In the embodiment shown, the upper and lower reels of film are vertically and diagonally spaced with respect to one another so that strips of film F extending between respective pairs are positioned to intercept each end of a tube 23 as it is advanced by the conveyor system, the tubes being of greater length than the conveying rollers 20, as seen in dotted lines in FIG. 3, so as to intercept the film F. Preferably, hold-down bars 31 extend longitudinally above the conveyor assembly for preventing the tubes 23 from becoming dislodged from the pairs of conveyor rollers 20 as they pass toward and through the banding station.

It may be pointed out that the strip of banding film F is composed of a suitable heat-shrinkable plastic material such as polyolefin, polyvinylchloride, polyvinylidene fluoride, or materials having similar properties, and the film may initially be an integral strip, half of which is wound on the upper reel 27 and half on the lower reel 28. Alternatively, two, separate, individually reeled strips may be employed with their adjacent ends fused together to form an integral strip. As will be later described, in the course of the banding operation, these plastic strips are first partially wrapped around the ends of the tubes as they advance and subsequently severed and fused around the tubes, the fusing operation simultaneously fusing the bands around the tubes and re-uniting the ends of the strips being fed from the upper and lower reels.

Figure 4:
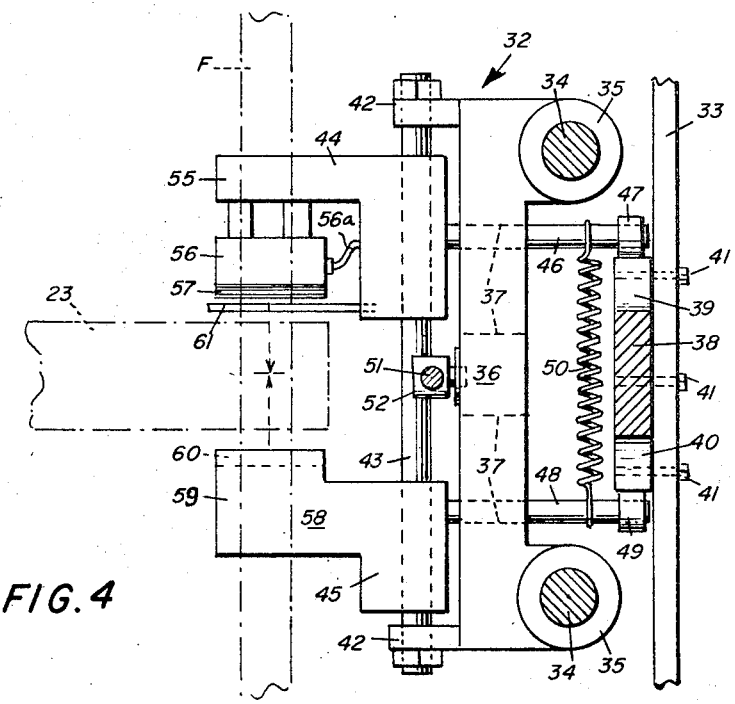
FIG. 4 is an enlarged detail view of the combined fusing and severing unit taken on line 4—4 of FIG. 1.

Referring to FIGS. 1 and 4, the film severing and fusing mechanisms, generally designated by the numeral 32, are laterally spaced and located approximately midway of the table top 11, in line for acting upon the films from both pairs of reels 27 and 28. Inasmuch as these mechanisms are substantially identical, a description of one will suffice.

An upstanding frame 33 carries a pair of vertically spaced, parallel, horizontal guide rods 34 which slidably support horizontal slide blocks 35, integrated with the upper and lower extremities of a vertical plate 36. Upper and lower vertical slots 37 extend through the plate 36 to accommodate the cam follower mechanism to be described.

A cam plate 38, having upper and lower cam surfaces 39 and 40, respectively, is bolted or otherwise secured to an upright member of the frame 33, as at 41. These cam surfaces are directed aft of the machine in converging planes as best seen in FIG. 1, and the upper cam surface 39 terminates in a slight dwell 39a, followed by an upwardly diverging area 39b, for the purpose hereinafter described.

The upper and lower extremities of the plate 36 are provided with laterally projecting lugs 42 which support a vertical guide bar 43, spaced laterally from the adjacent surface of the plate 36, as seen in FIG. 4. Upper and lower slide blocks 44 and 45, respectively, are mounted for vertical reciprocation on the guide bar 43. The upper slide block 44 carries a laterally projecting cam follower arm 46 which is fixed to the slide block and projects through the upper slot 37 of plate 36, its outer extremity being provided with a cam follower 47 which is aligned for engagement with the upper cam surface 39 of the cam plate. Similarly, the lower slide block 45 carries a laterally projecting cam follower arm 48 which extends through the lower slot 37 in plate 36 and carries at its outer end a cam follower 49 for engaging the lower cam surface 40.

Cam follower arms 46 and 48 are urged toward one another by a coil spring or the like 50 so that when the vertical plate 36 undergoes horizontal sliding movement on the rods 34, the cam folowers 47 and 49 are caused to operatively engage the respective cam surfaces 39 and 40. Thus, when the plate 36 is shifted to the right, as viewed in FIG. 1, the cam follower arms 46 and 48 are spread apart vertically, imparting corresponding movement to the vertical slide blocks 44 and 45, respectively. When the vertical plate 36 is moved aft or to the left, as seen in FIG. 1, the spring 50 causes the cam follower arms 46 and 48 to move vertically toward one another through the slots 37 in the plate, imparting corresponding movement to the slide blocks 44 and 45.

Inasmuch as the cam plate 38 is fixed to the frame 33, the horizontal reciprocation of the vertical plate 36 causes the cam followers 47 and 49 and the slide blocks 44 and 45, respectively, to follow alternately converging and diverging paths as the cam followers engage the respective cam surfaces. The effect of this pattern of movement will be described later.

Reciprocating movement is imparted to the plate 36 and the assembly of parts thereon by means of a pitman rod 51 pivotally connected at one end to the plate 36, as at 52. The opposite end of the pitman rod is connected at 53 to a crank arm 54 mounted on the driveshaft 15, and by suitable gearing, the timing of the drive mechanism for both the conveyor 19 and pitman rod 51 is designed to coordinate the vertical shifting movement of the slide blocks 44 and 45 with the approach of the successive tubes 23 which are nested in the respective pairs of rollers 20, all as hereinafter described more in detail.

The upper slide block 44 carries a laterally projecting arm 55, the underside of which supports a heat bar 56 which is electrically connected to any suitable source of power by flexible conductor 56a. The underside of the heat bar 56 carries a heated blade 57 which is thermostatically controlled by any suitable means and constantly heated.

Similarly, the lower slide block 45 carries a laterally projecting arm 58 which supports an anvil 59, vertically aligned with the heat bar and blade 57. Preferably, the anvil 59 is provided with a back-up pad 60 of resilient high temperature silicone rubber or the like for engagement by the blade 57 in the course of severing and fusing the plastic strip F.

A pair of guide fingers 61 extend from the block 44 across the path of travel of the film strip F and are arranged to prevent the plastic film from contacting the hot heated blade 57 until the appropriate time for severing and fusing and to guide the film around the periphery of the tube 23 as the tube passes between the heated blade and anvil, as will be described in explaining the operation of the machine.

The output end of the machine is provided with a heating unit, generally indicated by the numeral 62, which overlies opposite ends of the tubes 23 as they advance from the film severing and fusing mechanism 32. As previously pointed out, the film F is composed of heat-shrinkable plastic which will shrink from 30 to 50% when subjected to moderate heat, thus causing the previously, loosely applied bands on the tube to firmly embrace the ends of the tube as it proceeds. This heating unit may be of the radiant type; or, in the form illustrated in the drawings, it may comprise a heat manifold 63, a heating element 64, and a blower 65, all supported by a bracket 66 connected to the frame 33. In FIG. 3, the left-hand heater and blower have been omitted for clarity.

OPERATION

In operation, when the motor 24 is energized, it causes the sequential pairs of rollers 20 on the endless conveyor 19 to continuously travel around the sprockets 17 and 18. Simultaneously, through the pitman rod 51, the film severing and fusing mechanism 32 is caused to reciprocate horizontally on rods 34, alongside the fixed cam plate 38. The spacing of the pairs of rollers 20 and the timing of the advance of the endless conveyor 19 are such as to successively present the pairs of rollers and the respective tubes 23 nested therein to the severing and fusing mechanism. The tubes are fed from suitable input mechanism (not shown) so as to deposit the tubes 23 between the conveyor rollers 20 of each pair as they pass the input feed mechanism in continuous motion, traveling in the direction of the arrow in FIG. 1. The conveyor rollers advance in contact with the upper roller track 22, which imparts to both rollers a counterclockwise rotation, which in turn causes the tubes 23 nested in the rollers to rotate in the reverse or clockwise direction, so as to insure that the product wound on the tube remains in a wound-up condition.

As each tube is advanced by the conveyor rollers, its ends intercept the bands of plastic film F fed from the upper and lower reels 27 and 28, and this sequence will probably be best understood by reference to FIGS. 5-9 inclusive. FIG. 5 shows the heat block 56 and anvil 59 in their extreme open or retracted positions, the cam followers 47 and 49 (FIG. 1) having reached their extreme vertical positions on the cam plate 38. The position of a tube with respect to the film F as it approaches the severing and sealing mechanism is shown in dotted lines at 23a in FIG. 5, and, here, it will be seen that the film F is presented in vertical position across the path of travel of the film. Preferably, the film is fed from both supply reels 27 and 28 and runs over a series of guide rollers 67 for controlling tension and directing its path of travel. The guide rollers 68 and 68a, adjacent the inlet of the severing and fusing unit 32, are arranged to initially direct the portion of the film to be intercepted by the tube 23 in a vertical position for engagement with the tube. As seen in the drawings, as the film approaches the inlet of unit 32, it passes under and over rollers 68 and 68a which are arranged in vertically spaced pairs so that when the film reaches the final pair of rollers 68a, it is presented vertically, as shown in dotted lines in FIG. 5. In order to take up slack and control the tension of the film, tension controlling arms 69 are provided.

As the tube advances from position 23a in the direction of the arrows shown in FIG. 5, it is intercepted by the film F as at 23b, and its continued advance draws the film around the periphery of the tube until it has passed between the heat bar 56 and anvil 59, as shown in FIG. 6. Inasmuch as the heat bar and anvil are carried by and moved with the horizontally sliding vertical plate 36, FIG. 4, the engagement of their respective cam followers 47 and 49, with the cam surfaces on plate 38, causes the heat bar and anvil to follow forwardly converging paths of travel until the tube 23 has passed therebetween.

As the tube 23 passes through the space between the separated heater bar and anvil, it is prevented from prematurely contacting the heated blade 57 by fingers 61. However, as seen in FIG. 6, by the time the heater blade 57 engages the back-up pad 60 of the anvil, the film F has been wrapped entirely around the tube, and the two trailing portions of the film are severed by the heater blade 57 and simultaneously fused as at F' to form a relatively loose band of film around the tube, as shown in FIG. 7. At the same time, the two ends of the strip F, which have been severed during the banding operation, are also fused to re-unite the film strip for a succeeding banding operation, when the film again assumes the vertical position shown in dotted lines in FIG. 5, ready to intercept the next tube. The dwell 39a and diverging surface 39b in cam surface 39 maintains the exact dwell time and pressure of the blade 59 on anvil 54 to effect severing of the film F and fusing the same on opposite sides of the blade.

Returning to FIG. 1, the loosely banded tube 23, still nested in its rollers 20, is conducted beneath the heater unit 62 where the heat-shrinkable film is caused to shrink tightly around the tube under the influence of the heat from unit 62, as seen in FIG. 8. The tube is then discharged from the output end of the machine by gravity into any suitable receiving means. During its travel through the heating unit, the tube continues to partake of clockwise rotation so that it is uniformly heated around its entire periphery. FIG. 7 shows the film weld F-1 where the ends of the film have been united in a preceding operation with the trailing ends of the film being joined around the tube. FIG. 8 shows the film welds F-1 and F-2 after passing through the severing and fusing unit and having been subjected to the heat unit 62 for shrinkage. FIG. 9 shows the completely banded tube.

It will be apparent that the present invention makes possible a positively controlled, continuous banding operation employing a thermostatically controlled, constantly heated knife which is cam operated in coordination with the advance of the tubes to be banded. Simultaneously with the severing and sealing of the band around the tube, the severed ends of the remaining strips of film are re-united and ready for presentation to a succeeding tube. After severing and sealing the band in a relatively loose condition, as a part of the machine function, the loose band is subjected to heat for shrinkage while the tube is still under full control of the machine. Preferably, the bands on the tube may be easily slipped off of the tube by an ultimate user thereof.

While the invention has been described in particular relation to the banding of a tube with sheets of paper rolled thereon, it will be apparent that there are many products which can be banded by a machine such as covered by this application. However, it is felt that the principle is clearly illustrated in describing the present embodiment.

From the foregoing, it is believed that the invention may be readily understood by those skilled in the art without further description, it being borne in mind that numerous changes may be made in the details disclosed without departing from the spirit of the invention as set forth in the following claims.

We claim:

1. A tube banding machine comprising a support member, an endless conveyor running longitudinally of said support member and carrying a series of transversely disposed, spaced rollers consecutively arranged in coacting pairs, drive means for said conveyor, a banding mechanism comprising an upstanding frame on said support member, a pair of parallel, vertically spaced, horizontal guide rods carried by said frame, a vertical plate having slide bearings at opposite ends, longitudinally slidable on respective guide rods, a vertical rod having its opposite ends fixed to and laterally spaced from one side of said plate, upper and lower vertical slide blocks oppositely slidable on said bar, a heated blade supported on and movable with said upper slide block, a coacting anvil supported by and movable with said lower slide block, a source of heat for said blade, a stationary cam plate fixed to said frame adjacent the opposite side of said vertical plate and having upper and lower cam surfaces which converge in the direction of travel of the top run of said conveyor, cam followers fixed respectively to said blade and anvil and extending through complementary vertical slots in said vertical plate, means coordinated with said conveyor drive means for sliding said vertical plate on said horizontal guide rods, a pair of supply reels mounted on said frame in vertically spaced relation for supporting opposite ends of a strip of heat-shrinkable plastic film and extending a portion thereof across the path of travel of advancing tubes nested in respective pairs of rollers in a plane substantially perpendicular to the plane of said path of travel, guide means associated with said blade and anvil for preventing premature contact of said blade and strip, and directing said strip loosely around the periphery of said tube to thereby form a peripheral band on said tube, and heat means posterior to said banding mechanism for shrinking said strip around said tube.

2. A machine as claimed in claim 1, including track means underlying said pairs of rollers on the top run of said conveyor for imparting thereto rotary movement in one direction, to thereby impart rotary movement in the opposite direction to a tube nested in respective pairs of rollers.

References Cited

UNITED STATES PATENTS

| | | | |
|---|---|---|---|
| 3,186,543 | 6/1965 | Minick et al. | 53—3 X |
| 3,236,024 | 2/1966 | Bradley et al. | 53—229 X |
| 3,237,371 | 3/1966 | Gerlach | 53—182 |
| 3,290,862 | 12/1966 | Lagesse | 53—198 X |
| 3,325,966 | 6/1967 | Bruce et al. | 53—198 |
| 3,438,173 | 4/1969 | Omori | 53—182 X |

THERON E. CONDON, Primary Examiner

N. ABRAMS, Assistant Examiner

U.S. Cl. X.R.

53—229